US011356752B2

(12) United States Patent
Shih (10) Patent No.: US 11,356,752 B2
(45) Date of Patent: Jun. 7, 2022

(54) TELECOMMUNICATIONS PANEL WITH GROUNDING WIRE (71) Applicant: COMMSCOPE TECHNOLOGIES LLC, Hickory, NC (US)

(72) Inventor: Yi Teh Shih, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/762,780

(22) PCT Filed: Nov. 8, 2018

(86) PCT No.: PCT/US2018/059780
§ 371 (c)(1),
(2) Date: May 8, 2020

(87) PCT Pub. No.: WO2019/094560
PCT Pub. Date: May 16, 2019

(65) Prior Publication Data
US 2020/0351573 A1   Nov. 5, 2020

Related U.S. Application Data (60) Provisional application No. 62/584,543, filed on Nov. 10, 2017.

(51) Int. Cl.
*H04M 5/02* (2006.01)
*H04Q 1/14* (2006.01)
*H04Q 1/02* (2006.01)

(52) U.S. Cl.
CPC .............. *H04Q 1/142* (2013.01); *H04Q 1/13* (2013.01); *H04Q 1/145* (2013.01); *H04Q 1/149* (2013.01)

(58) Field of Classification Search
CPC .................................. H04Q 1/42; H04Q 1/13
USPC ............................................ 379/327, 399.01
See application file for complete search history.

(56) References Cited

U.S. PATENT DOCUMENTS

| 3,666,996 A | 5/1972 | Brown |
| 3,739,076 A | 6/1973 | Schwartz |
| 3,830,957 A | 8/1974 | Oberdiear |
| 4,284,316 A | 8/1981 | Debaigt |
| 4,537,458 A | 8/1985 | Worth |

(Continued)

FOREIGN PATENT DOCUMENTS

| CN | 101095264 A | 12/2007 |
| CN | 101510649 A | 8/2009 |

(Continued)

OTHER PUBLICATIONS

International Search Report and Written Opinion of the International Searching Authority for International Patent Application No. PCT/US2018/059780 dated Mar. 4, 2019, 12 pages.

(Continued)

*Primary Examiner* — William J Deane, Jr.
(74) *Attorney, Agent, or Firm* — Merchant & Gould P.C.

(57) ABSTRACT

A telecommunications panel includes a panel frame and a ground wire secured to the panel frame. The ground wire extends longitudinally along the panel frame. The ground wire may be arranged such that modular jacks presses against the ground wire when the modular jacks are received in the panel frame. The ground wire can be made of a tin plated conductive material.

20 Claims, 10 Drawing Sheets

(56) References Cited

U.S. PATENT DOCUMENTS

| | | |
|---|---|---|
| 4,660,912 A | 4/1987 | Tomek |
| 4,679,879 A | 7/1987 | Triner et al. |
| 4,721,476 A | 1/1988 | Zeliff et al. |
| 4,747,785 A | 5/1988 | Roberts et al. |
| 4,760,215 A | 7/1988 | Cook et al. |
| 4,790,765 A | 12/1988 | Ehrenfels et al. |
| 4,810,210 A | 3/1989 | Komatsu |
| 4,824,400 A | 4/1989 | Spinner |
| 4,830,628 A | 5/1989 | Dyson et al. |
| 4,842,553 A | 6/1989 | Ingram |
| 4,857,015 A | 8/1989 | Michaels et al. |
| 5,021,610 A | 6/1991 | Roberts |
| 5,169,346 A | 12/1992 | Johnston |
| 5,238,416 A | 8/1993 | Dickie |
| 5,240,436 A | 8/1993 | Bradley et al. |
| 5,278,352 A | 1/1994 | Schade |
| 5,310,359 A | 5/1994 | Chadbourne et al. |
| 5,445,538 A | 8/1995 | Rodrigues et al. |
| 5,571,023 A | 11/1996 | Anthony |
| 5,675,126 A | 10/1997 | Halvorsen |
| 5,691,506 A | 11/1997 | Miyazaki et al. |
| 5,697,806 A | 12/1997 | Whiteman, Jr. et al. |
| 5,762,517 A | 6/1998 | Abe |
| 5,769,647 A | 6/1998 | Tulley et al. |
| 6,015,307 A * | 1/2000 | Chiu ............... H01R 13/71 |
| | | 200/51.09 |
| 6,077,122 A | 6/2000 | Elkhatib et al. |
| 6,086,415 A | 7/2000 | Sanchez et al. |
| 6,244,908 B1 | 6/2001 | Hammond et al. |
| 6,247,849 B1 | 6/2001 | Liu |
| 6,254,403 B1 | 7/2001 | Bernardini |
| 6,292,564 B1 | 9/2001 | Cowan et al. |
| 6,354,851 B1 | 3/2002 | Bachle |
| 6,386,915 B1 | 5/2002 | Nelson |
| 6,394,853 B1 | 5/2002 | Hammond et al. |
| 6,425,694 B1 | 7/2002 | Szilagyi et al. |
| 6,520,781 B2 | 2/2003 | Koide et al. |
| 6,537,104 B1 | 3/2003 | Hagmann et al. |
| 6,612,750 B1 | 9/2003 | Bull et al. |
| 6,652,152 B2 | 11/2003 | Yang et al. |
| 6,702,477 B1 | 3/2004 | Ngo |
| 6,848,833 B1 | 2/2005 | Kamarauskas et al. |
| 6,866,541 B2 | 3/2005 | Barker et al. |
| 6,872,090 B2 | 3/2005 | De Dios Martin |
| 7,029,182 B2 | 4/2006 | Ngo |
| 7,033,219 B2 | 4/2006 | Gordon et al. |
| 7,087,840 B2 | 8/2006 | Herring et al. |
| 7,112,090 B2 | 9/2006 | Caveney et al. |
| 7,156,696 B1 | 1/2007 | Montena |
| 7,207,846 B2 * | 4/2007 | Caveney ............... H01R 29/00 |
| | | 439/676 |
| 7,220,145 B2 | 5/2007 | Denovich et al. |
| 7,273,383 B1 | 9/2007 | Bennett |
| 7,329,139 B2 | 2/2008 | Benham |
| 7,340,146 B2 | 3/2008 | Lampert et al. |
| 7,384,298 B2 | 6/2008 | Caveney et al. |
| 7,416,448 B2 | 8/2008 | Gaidosch |
| 7,476,120 B2 | 1/2009 | Patel et al. |
| 7,510,421 B2 | 3/2009 | Fransen et al. |
| 7,621,772 B1 | 11/2009 | Tobey |
| 7,628,644 B1 | 12/2009 | Peluffo |
| 7,628,657 B2 | 12/2009 | Martich |
| 7,637,769 B2 | 12/2009 | Carreras Garcia et al. |
| 7,645,160 B2 | 1/2010 | Tabet |
| 7,676,133 B2 | 3/2010 | Lampert et al. |
| 7,727,013 B1 | 6/2010 | Paynter |
| 7,766,688 B2 | 8/2010 | Mateo Ferrus et al. |
| 7,806,721 B2 | 10/2010 | Herndon et al. |
| 7,819,698 B2 | 10/2010 | Islam |
| 7,854,624 B1 * | 12/2010 | Pepe ............... H01R 13/518 |
| | | 439/489 |
| 7,857,663 B2 | 12/2010 | Chantrell et al. |
| 7,871,285 B1 | 1/2011 | Tobey et al. |
| 7,874,865 B2 | 1/2011 | Tobey |
| 7,909,622 B2 * | 3/2011 | Pepe ............... H01R 13/659 |
| | | 439/95 |
| 7,938,680 B1 | 5/2011 | Hsieh |
| 7,955,120 B2 | 6/2011 | Patel et al. |
| 8,057,249 B1 | 11/2011 | Tobey et al. |
| 8,070,506 B2 | 12/2011 | De Dios Martin et al. |
| 8,075,344 B2 | 12/2011 | Shih |
| 8,109,784 B2 | 2/2012 | Patel et al. |
| 8,241,055 B2 | 8/2012 | Chen |
| 8,376,786 B2 | 2/2013 | Carreras Garcia et al. |
| 8,454,383 B2 | 6/2013 | Paynter et al. |
| 8,747,126 B2 | 6/2014 | Corbett et al. |
| 8,758,065 B2 | 6/2014 | Fransen et al. |
| 8,791,374 B1 | 7/2014 | Smith |
| 8,834,196 B2 | 9/2014 | Duran et al. |
| 9,022,792 B2 | 5/2015 | Sticker et al. |
| 9,583,885 B2 | 2/2017 | Ruesca Fernandez |
| 9,627,827 B2 | 4/2017 | Bragg |
| 9,640,898 B1 | 5/2017 | Wubbels |
| 9,768,556 B2 | 9/2017 | Bopp et al. |
| 9,847,607 B2 | 12/2017 | Bopp et al. |
| 10,476,212 B2 | 11/2019 | Bopp et al. |
| 10,522,939 B2 | 12/2019 | De Dios Martin |
| 10,594,088 B2 | 3/2020 | Cupples et al. |
| 10,651,608 B2 | 5/2020 | White |
| 10,777,953 B2 | 9/2020 | White et al. |
| 10,784,640 B2 | 9/2020 | Font Aranega et al. |
| 10,958,012 B2 | 3/2021 | De Dios Martin |
| 2002/0058432 A1 | 5/2002 | Chen et al. |
| 2002/0119681 A1 | 8/2002 | Follingstad et al. |
| 2003/0081907 A1 | 5/2003 | Malagrino, Jr. et al. |
| 2004/0038582 A1 | 2/2004 | Clement |
| 2004/0229501 A1 | 11/2004 | Caveney et al. |
| 2005/0103672 A1 | 5/2005 | Peng |
| 2005/0159036 A1 * | 7/2005 | Caveney ............... H01R 29/00 |
| | | 439/188 |
| 2005/0201071 A1 | 9/2005 | AbuGhazaleh et al. |
| 2006/0110986 A1 | 5/2006 | King, Jr. et al. |
| 2006/0204200 A1 | 9/2006 | Lampert et al. |
| 2007/0054521 A1 | 3/2007 | John |
| 2007/0240902 A1 | 10/2007 | Tapper |
| 2008/0090461 A1 | 4/2008 | Pepe et al. |
| 2008/0096438 A1 | 4/2008 | Clark et al. |
| 2008/0102686 A1 | 5/2008 | Carreras Garcia et al. |
| 2008/0268719 A1 | 10/2008 | Siemon et al. |
| 2008/0311800 A1 | 12/2008 | Tsai |
| 2009/0004913 A1 | 1/2009 | Caveney et al. |
| 2009/0034226 A1 * | 2/2009 | Herndon ............... H01R 13/745 |
| | | 361/822 |
| 2009/0243757 A1 | 10/2009 | Xu et al. |
| 2009/0258545 A1 | 10/2009 | Pepe et al. |
| 2009/0274422 A1 * | 11/2009 | Henry ............... H01R 13/7172 |
| | | 385/92 |
| 2009/0311904 A1 | 12/2009 | Chen |
| 2009/0318033 A1 | 12/2009 | Tobey |
| 2010/0151707 A1 | 6/2010 | AbuGhazaleh et al. |
| 2010/0216335 A1 | 8/2010 | Cobb |
| 2010/0255716 A1 * | 10/2010 | Frey ............... H04Q 1/09 |
| | | 439/540.1 |
| 2011/0030343 A1 | 2/2011 | Kiser et al. |
| 2011/0038581 A1 | 2/2011 | Mudd et al. |
| 2011/0097924 A1 | 4/2011 | Chen |
| 2011/0115494 A1 * | 5/2011 | Taylor ............... H01R 13/514 |
| | | 324/537 |
| 2011/0304343 A1 | 12/2011 | Font Aranega et al. |
| 2012/0196472 A1 | 8/2012 | Fitzpatrick |
| 2012/0226807 A1 * | 9/2012 | Panella ............... H04L 41/12 |
| | | 709/224 |
| 2012/0244736 A1 | 9/2012 | Duran et al. |
| 2012/0244752 A1 * | 9/2012 | Patel ............... H01R 13/6464 |
| | | 439/620.22 |
| 2012/0322307 A1 | 12/2012 | Kudo |
| 2013/0203291 A1 | 8/2013 | Sticker et al. |
| 2013/0210264 A1 | 8/2013 | Rynaski et al. |
| 2013/0217249 A1 * | 8/2013 | Patel ............... H01R 13/703 |
| | | 439/188 |
| 2013/0260582 A1 | 10/2013 | White |
| 2014/0080354 A1 | 3/2014 | Caveney et al. |

(56) References Cited

U.S. PATENT DOCUMENTS

| | | |
|---|---|---|
| 2014/0242855 A1 | 8/2014 | Kan et al. |
| 2014/0287609 A1 | 9/2014 | Fransen et al. |
| 2014/0335726 A1 | 11/2014 | Zhang |
| 2015/0349468 A1 | 12/2015 | Singer et al. |
| 2016/0080836 A1 | 3/2016 | Carreras Garcia |
| 2016/0248197 A1 | 8/2016 | Fransen et al. |
| 2016/0285205 A1 | 9/2016 | Ruesca Fernandez |
| 2017/0229825 A1* | 8/2017 | Baines ............... H01R 25/006 |
| 2017/0302040 A1* | 10/2017 | Taylor ............... H01R 13/436 |
| 2018/0287312 A1 | 10/2018 | De Dios Martin et al. |
| 2018/0358739 A1 | 12/2018 | De Dios Martin |
| 2020/0137465 A1 | 4/2020 | White et al. |
| 2020/0244003 A1 | 7/2020 | De Dios Martin |
| 2020/0267862 A1 | 8/2020 | Taguchi et al. |
| 2021/0104850 A1 | 4/2021 | White et al. |
| 2021/0143600 A1 | 5/2021 | Font Aranega et al. |
| 2021/0281009 A1 | 9/2021 | De Dios Martin |

FOREIGN PATENT DOCUMENTS

| | | |
|---|---|---|
| CN | 201303074 Y | 9/2009 |
| CN | 201741918 U | 2/2011 |
| CN | 201774068 U | 3/2011 |
| CN | 202025948 U | 11/2011 |
| CN | 102957034 A | 3/2013 |
| CN | 203218574 U | 9/2013 |
| CN | 103384042 A | 11/2013 |
| DE | 101 13 230 A1 | 9/2002 |
| EP | 0 073 112 A1 | 3/1983 |
| EP | 0 775 845 A2 | 5/1997 |
| EP | 1 189 085 A2 | 3/2002 |
| EP | 1 422 793 A1 | 5/2004 |
| EP | 1 443 608 A2 | 8/2004 |
| EP | 1 484 824 A2 | 12/2004 |
| EP | 2 133 957 A1 | 12/2009 |
| ES | 2 178 813 T3 | 1/2003 |
| ES | 2 257 514 T3 | 8/2006 |
| ES | 1 138 538 U | 4/2015 |
| ES | 2 583 636 A1 | 9/2016 |
| ES | 2 584 539 A1 | 9/2016 |
| ES | 2 600 968 A1 | 2/2017 |
| FR | 2 701 007 A1 | 8/1994 |
| FR | 2 893 454 A1 | 5/2007 |
| GB | 221 872 | 9/1924 |
| GB | 2 260 660 A | 4/1993 |
| GB | 2 308 508 A | 6/1997 |
| GB | 2 457 982 A | 9/2009 |
| GB | 2 469 123 A | 10/2010 |
| JP | 2001-244029 A | 9/2001 |
| JP | 2006-126807 A | 5/2006 |
| JP | 2007-299620 A | 11/2007 |
| JP | 2007-313060 A | 12/2007 |
| JP | 2013-235783 A | 11/2013 |
| KR | 2001-0100594 A | 11/2001 |
| KR | 20-2010-0008888 U | 9/2010 |
| TW | M349117 U | 1/2009 |
| WO | 95/34923 A1 | 12/1995 |
| WO | 97/44862 A1 | 11/1997 |
| WO | 99/19944 A1 | 4/1999 |
| WO | 03/026076 A1 | 3/2003 |
| WO | 2005/104300 A1 | 11/2005 |
| WO | 2008/059203 A2 | 5/2008 |
| WO | 2008/095830 A1 | 8/2008 |
| WO | 2011/038387 A1 | 3/2011 |
| WO | 2013/090201 A1 | 6/2013 |
| WO | 2013/096279 A1 | 6/2013 |
| WO | 2013/123154 A1 | 8/2013 |
| WO | 2014/167449 A1 | 10/2014 |
| WO | 2016/151172 A1 | 9/2016 |
| WO | 2016/151177 A1 | 9/2016 |
| WO | 2016/156643 A1 | 10/2016 |
| WO | 2016/156644 A1 | 10/2016 |
| WO | 2018/009698 A1 | 1/2018 |
| WO | 2018/034870 A1 | 2/2018 |
| WO | 2018/236875 A1 | 12/2018 |
| WO | 2019/094558 A1 | 5/2019 |

OTHER PUBLICATIONS

"Mini-Com All Metal Shielded Modular Patch Panels, Installation Instructions", Panduit, 2 pages (2010).
"Mini-Com® All Metal Shielded Modular Patch Panels, Installation Instructions, Specification Sheet", Panduit, 3 pages (2016).
Extended European Search Report for Application No. 18875839.5 dated Jul. 19, 2021.
Extended European Search Report for Application No. 17841856.2 dated Feb. 19, 2020.
Extended European Search Report for Application No. 20174844.9 dated Aug. 24, 2020.
Extended European Search Report for Application No. 18820793.0 dated Feb. 12, 2021.
International Search Report and Written Opinion for Application No. PCT/ES2016/070204 dated Jun. 6, 2016.
International Search Report and Written Opinion for Application No. PCT/ES2016/070212 dated Jun. 2, 2016.
International Search Report and Written Opinion for Application No. PCT/ES2016/070213 dated Jun. 7, 2016.
International Search Report and Written Opinion for Application No. PCT/ES2016/070190 dated Jul. 5, 2016.
International Search Report and Written Opinion for Application No. PCT/EP2016/069310 dated Oct. 14, 2016.
International Search Report and Written Opinion for Application No. PCT/US2017/040947 dated Oct. 13, 2017.
International Search Report and Written Opinion for Application No. PCT/US2017/045539 dated Nov. 15, 2017.
International Search Report and Written Opinion for Application No. PCT/US2018/038295 dated Oct. 16, 2018.
Product Specifications: 1-1479191-3, SL Series Speaker Post Insert, red stripe, alpine white, CommScope, Inc., 1 page (Sep. 6, 2017).
State of the Art Report for Application No. 201530372 dated Mar. 20, 2015.
State of the Art Report for Application No. 201530377 dated Mar. 23, 2015.
State of the Art Report for Application No. 201530417 dated Mar. 27, 2015.
State of the Art Report for Application No. 201530418 dated Mar. 27, 2015.
State of the Art Report for Application No. 201530419 dated Mar. 27, 2015.
State of the Art Report for Application No. 201531199 dated Aug. 13, 2015.
First Office Action for Chinese Patent Application No. 201880072621.7 dated Aug. 17, 2021, 21 pages.

* cited by examiner

TELECOMMUNICATIONS PANEL WITH GROUNDING WIRE

CROSS-REFERENCE TO RELATED APPLICATION

This application is a National Stage Application of PCT/US2018/059780, filed on Nov. 8, 2018, which claims the benefit of U.S. Patent Application Ser. No. 62/584,543, filed on Nov. 10, 2017, the disclosures of which are incorporated herein by reference in their entireties. To the extent appropriate, a claim of priority is made to each of the above disclosed applications.

BACKGROUND

Patching equipment is used for connection between telecommunications apparatuses. Patching equipment typically includes one or more patch panels which are mounted to a distribution frame rack so as to generally define a patching side, where patch cords from another active device or another pat panel can be cross-connected or interconnected, and a distribution side, where cables from network equipment and/or work station areas are terminated.

As various electrical components are used in patching equipment, grounding is important for protection of people and property. For example, patch panels can mount a number of electrical components, such as electrical connectors or jacks, in a dense configuration, and such multiple electrical components need to be grounded in an effective and cost-efficient manner.

SUMMARY

In general terms, the present disclosure relates to a patch panel with a grounding wire. In one possible configuration and by non-limiting example, the patch panel includes a ground wire which is routed to ground all modular jacks mounted to the patch panel. Various aspects are described in this disclosure, which include, but are not limited to, the following aspects.

In one aspect, a telecommunications panel includes a panel frame and a ground wire secured to the panel frame. The panel frame has a front panel portion and opposite side panel portions. The front panel portion extends between the opposite side panel portions and configured to receive a plurality of modular jacks therethrough. The ground wire extends longitudinally along the panel frame. The ground wire may be arranged such that the plurality of modular jacks presses against the ground wire when the plurality of modular jacks are received through the front panel portion of the panel frame. In certain examples, the ground wire is a tin plated conductive wire. In certain examples, the ground wire may have a rounded cross section. In certain examples, the ground wire may have a rectangular or square cross section.

In certain examples, the ground wire is configured to engage with latching elements of the modular jacks for securing the modular jacks to the panel frame.

In certain examples, at least one of the opposite side panel portions includes a panel grounding element configured to ground the telecommunications panel to an equipment rack. The ground wire may be electrically connected to the panel grounding element. The panel grounding element may include a fastener that secures the ground wire to the at least one of the opposite side panel portions.

In certain examples, the panel frame includes a channel extending between the opposite side panel portions and configured to receive the ground wire.

In certain examples, the panel frame further may include opposite lateral flanges adjacent the opposite side panel portions. The lateral flanges include mounting elements configured to mount the telecommunications panel to an equipment rack.

In certain examples, the telecommunications panel may further include a plurality of receptacle modules secured to the panel frame and defining a plurality of jack receptacle openings for receiving the plurality of modular jacks, respectively.

In certain examples, the plurality of modular jacks may be secured to the panel frame in at least one row extending between the opposite side panel portions of the panel frame. The ground wire may be routed in a direction parallel with the at least one row.

In certain example, the telecommunications panel includes one or more of the plurality of modular jacks.

In another aspect, a telecommunications panel includes a panel frame, a plurality of receptacle modules, and a ground wire. The panel frame includes a front panel portion having a front face and an opposite rear face; a top panel portion extending from the rear face of the front panel portion; a bottom panel portion extending from the rear face of the front panel portion and arranged to be parallel with the top panel portion; and opposite side panel portions extending from the rear face of the front panel portion. The front panel portion may longitudinally extends between the opposite side panel portions and have a plurality of receptacle module openings. The plurality of receptacle modules may be at least partially received in the plurality of receptacle module openings, respectively. The plurality of receptacle modules may be secured to the panel frame between the top panel portion and the bottom panel portion. Each of the plurality of receptacle modules may include a plurality of jack receptacle openings configured to receive a plurality of modular jacks therethrough, respectively. The ground wire may route longitudinally along the panel frame. The ground wire may be arranged such that the plurality of modular jacks presses against the ground wire when the plurality of modular jacks are received through the plurality of jack receptacle openings of the plurality of receptacle modules. In certain examples, the ground wire may have a rounded cross section. In certain examples, the ground wire may have a rectangular or square cross section.

In certain examples, each of the plurality of receptacle modules may include a front part having a front face and an opposite rear face; a top part extending from the rear face and configured to arrange adjacent the top panel portion of the panel frame when the receptacle module is secured to the panel frame; a bottom part extending from the rear face and configured to arrange adjacent the bottom panel portion of the panel frame when the receptacle module is secured to the panel frame; and at least one partition wall extending between the top part and the bottom part and defining the plurality of jack receptacle openings. In certain examples, the bottom part may include a channel configured to receive the ground wire.

In certain examples, the plurality of jack receptacle openings may be arranged in at least one row. The channel may extend in a direction parallel with the at least one row. In certain examples, the ground wire is a tin plated conductive wire.

In certain examples, at least one of the opposite side panel portions includes a panel grounding element configured to ground the telecommunications panel to an equipment rack. The ground wire may be electrically connected to the panel grounding element. In certain examples, the panel grounding element includes a fastener that secures the ground wire to the at least one of the opposite side panel portions.

In certain examples, the panel frame further includes opposite lateral flanges adjacent the opposite side panel portions. The lateral flanges may include mounting elements configured to mount the telecommunications panel to an equipment rack.

In certain examples, each of the plurality of modular jacks has a main body made of metallic material. The main body may be arranged to directly contact with the ground wire when the modular jack is secured to the panel frame.

In certain examples, the panel frame and the plurality of receptacle modules are integrally formed.

In certain example, the telecommunications panel includes one or more of the plurality of modular jacks.

Yet another aspect is a method for engaging a modular jack with a telecommunications panel. The method includes arranging a ground wire to a panel frame of the telecommunications panel to extend longitudinally along the panel frame; and securing a modular jack to the panel frame by directly pressing against the ground wire.

DETAILED DESCRIPTION

Various embodiments will be described in detail with reference to the drawings, wherein like reference numerals represent like parts and assemblies throughout the several views.

Referring to FIGS. 1A, 1B, 2A, 2B, 3A, and 3B, a patch panel system 100 in accordance with the present disclosure includes a patch panel 102 and one or more modular jacks 104 (also referred to herein as jack modules). The patch panel 102, which is an example of telecommunications panel) is configured to mount to a network rack (also referred to herein as a communications rack, equipment rack, or the like) (not shown). The modular jacks 104 are configured to mount to the patch panel 102.

Figure 7:
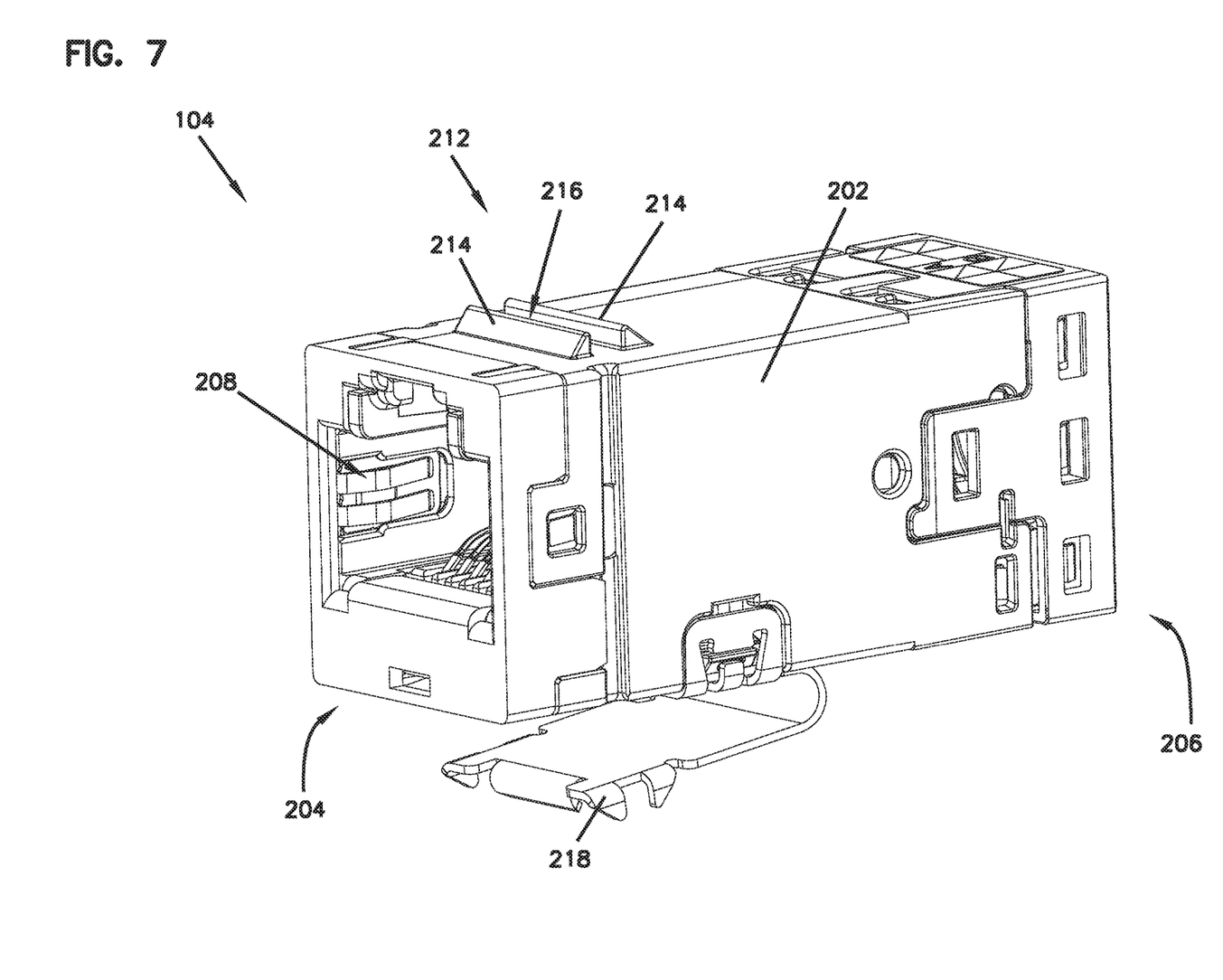
FIG. 7 is a perspective view of an example modular jack.
Figure 8:
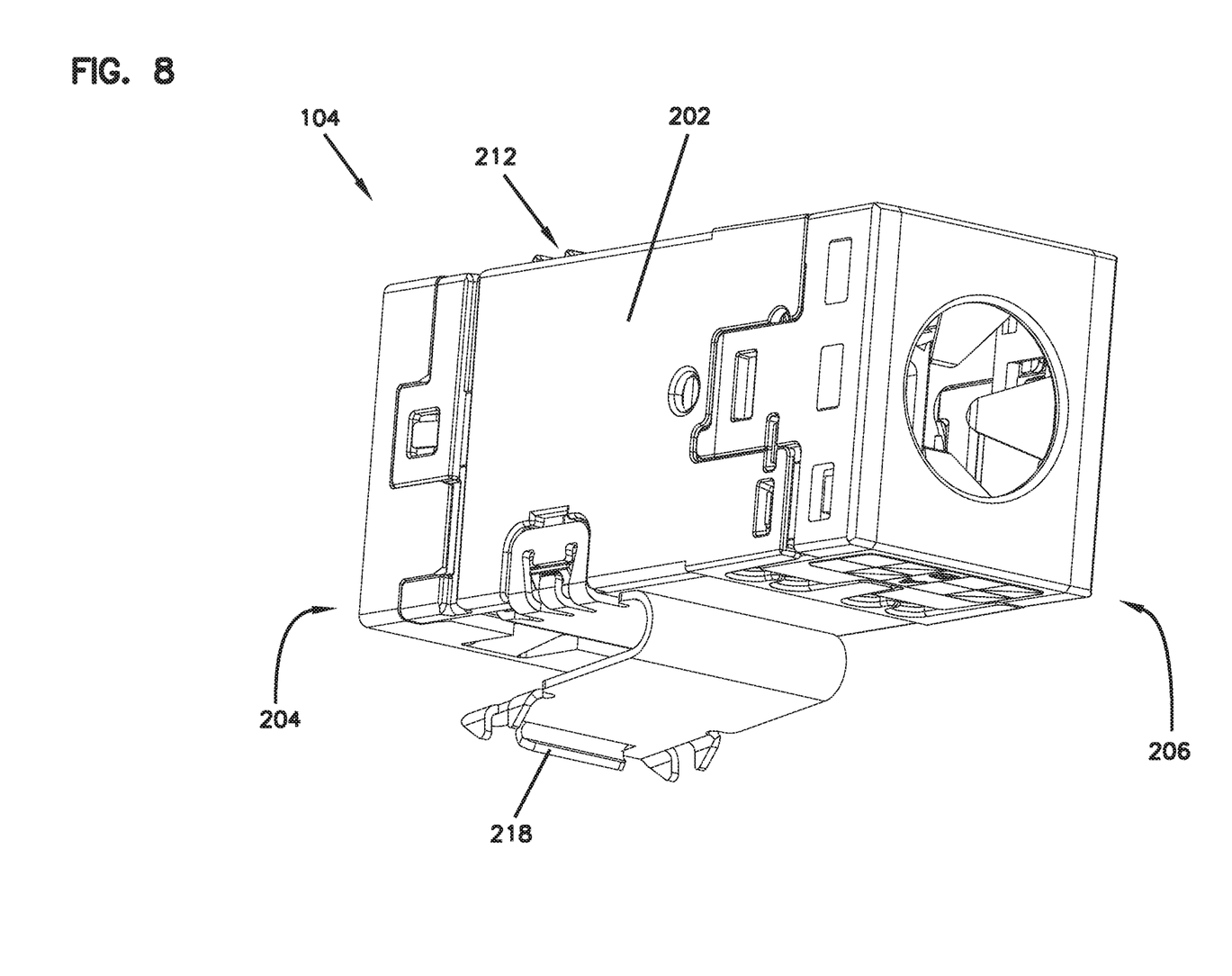
FIG. 8 is another perspective view of the modular jack of FIG. 7

The modular jack 104 is configured to include one or more types of cable termination interfaces. In some embodiments, such cable termination interfaces are configured for electrical jacks. In other embodiments, the modular jack 104 is configured to include various types of optical adapters or other media interfaces. Referring to FIGS. 7 and 8, one example of the modular jack 104 is illustrated, which can be mounted to the patch panel 102. In this example, the modular jack 104 includes a main body 202 extending between a front end 204 and a rear end 206. The modular jack 104 further includes a jack receptacle 208 formed at the front end 204. In some examples, the jack receptacle 208 is configured as an RJ-type jack receptacle. The modular jack 104 includes a latching element 212 configured to mount the modular jack 104 to the patch panel 102. In some examples, the latching element 212 is provided on the main body 202 at a location between the front end 204 and the rear end 206. For example, the latching element 212 can be located closer to the front end 204 than the rear end 206. Other locations are also possible for the latching element 212. In the illustrated example, the latching element 212 includes a pair of projections 214 extending from one surface of the main body 202 and defining a slot 216. In addition, the latching element 212 includes a flexible latch 218 formed on the opposite surface of the main body 202.

Although it is primarily described herein that the modular jack 104 is engaged with (e.g., mounted to, inserted into, and/or secured to) the patch panel 102, one or more other electrical devices, such as electrical inserts, can also be engaged with the patch panel 102 in the same or similar manner as the modular jack 104. Such other electrical devices including the modular jack can be referred to herein as patching devices.

In some examples, the main body 202 is made of metallic material. In other examples, the main body 202 is made from a dielectric material (e.g., a plastic material) which is shielded by a metallic material or a metalized plastic material, or by a metallic shield element. As described herein, when the modular jack 104 is mounted to the patch panel 102, the main body 202 is arranged to directly contact with a grounding wire that is provided to the patch panel 102 for grounding the modular jack 104.

In the illustrated example of FIGS. 7 and 9, the modular jack 104 is a shielded twisted pair (STP) cable jack. As described herein, a ground wire 170 of the patch panel 102 is used to ground such a STP jack in the patch panel 102. It is primarily described in the present disclosure that shielded twisted pair (STP) cable jacks are used with the patch panel 102. However, the patch panel 102 can also be used with unshielded twisted pair (UTP) cable jacks. For example, the patch panel 102 includes mechanical retaining features to enable an unshielded twisted pair (UTP) jack to be installed therein as necessary.

Other configurations of modular jacks 104 can also be used in the patch panel system 100 of the present disclosure. Examples of such modular jacks 104 are described in U.S. Pat. No. 7,874,865, titled Electrical Connector with a Compliant Cable Strain Relief Element, issued Jan. 25, 2011; PCT Publication No. WO 2016/156644, titled A CONNECTOR ASSEMBLY WITH A CONNECTOR, A LATCH MEMBER AND A PANEL, filed Mar. 26, 2016; U.S. Patent Application Ser. No. 62/521,885, titled HIGH DENSITY BENZEL FOR PATCH PANEL, filed Jun. 19, 2017; U.S. Patent Application Ser. No. 62/375,269, titled CABLE CLAMP/SCREEN CONNECTOR WITH COMPLIANT LATCH, filed Aug. 15, 2016; and U.S. Patent Application Ser. No. 62/521,952, titled CONNECTOR ASSEMBLY WITH GROUNDING CONNECTOR PART, filed Jun. 19, 2016, the disclosures of which are incorporated herein by reference in their entireties.

In FIGS. 1A, 1B, 2A, 2B, 3A, and 3B, a single modular jack 104 is shown as being inserted into the patch panel 102. It is understood that the patch panel 102 can be either partially or fully loaded with a plurality of modular jacks 104 in the same or similar manner as the modular jack 104 shown in the illustrated example.

The patch panel 102 of the present disclosure is configured to interchangeably mount various types of modular jacks, such as UTP jacks and STP jacks. As described herein, the patch panel 102 includes a panel frame 112 having retaining features for securing both UTP jacks and STP jacks. Further the patch panel 102 includes a ground wire 170 that creates the patch panel 102 to jack grounding and/or bonding.

Referring to FIGS. 1A, 1B, 2A, 2B, 4A, and 4B, the patch panel 102 includes a panel frame 112 and one or more receptacle modules 114 mounted to the panel frame 112.

The panel frame 112 is configured to receive a plurality of modular jacks 104. The panel frame 112 includes a front panel portion 122, opposite side panel portions 124, a top panel portion 128, and a bottom panel portion 130. In some examples, the front panel portion 122, the top panel portion 128, and the bottom panel portion 130 generally extend between the opposite side panel portions 124. The front panel portion 122 extends longitudinally between the side panel portions 124. In the illustrated examples, the front panel portion 122 extends linearly between the opposite side panel portions 124. In other examples, the front panel portion 122 can extend in different configurations, such as where the front panel portion 122 is bent at one or more locations, or where the front panel portion 122 is curved or angled.

The front panel portion 122 has a front face 132 and a rear face 134 opposite to the front face 132. The top panel portion 128 and the bottom panel portion 130 extend rearwards from the rear face 134 of the front panel portion 122 and are arranged to be parallel with each other. In some examples, the side panel portions 124 extend rearwards from the rear face 134 of the front panel portion 122.

The panel frame 112 can further include opposite lateral flanges 136 adjacent the opposite side panel portions 124. The lateral flanges 136 including mounting elements 138 configured to mount the patch panel 102 to an equipment rack, chassis, cabinet, or other structures. In some examples, the mounting elements 138 include holes through which fasteners (e.g., screws or bolts) pass to secure the patch panel 102 to the rack. In the illustrated example, the lateral flanges 136 extend laterally from the front panel portion 122.

The panel frame 112 can be made of various materials. In some examples, the panel frame 112 is made of metallic materials, such as steel or other metals, although other materials may be used alternatively or in addition.

The panel frame 112 can include one or more receptacle module openings 140 for receiving the receptacle modules 114. In some examples, the front panel portion 122 of the panel frame 112 includes a plurality of receptacle module openings 140 configured to at least partially receive the receptacle modules 114. The receptacle modules 114 can be at least partially inserted into the receptacle module openings 140 of the panel frame 112 and mounted to the panel frame 112. The receptacle modules 114 can be secured to the panel frame 112 in various manners. In some examples, the receptacle modules 114 are snap-fitted to the panel frame 112. For example, the receptacle module 114 includes one or more latching elements 142 (e.g., projections or tabs) configured to engage with corresponding latching elements 144 (e.g., holes or recesses) of the panel frame 112. In other examples, the receptacle modules 114 can be mounted to the panel frame 112 with fasteners.

As described, the receptacle module 114 can be at least partially received in the receptacle module opening 140 and secured to the panel frame 112. The receptacle module 114 can be arranged between the top panel portion 128 and the bottom panel portion 130 when secured to the panel frame 112. The receptacle module 114 includes a plurality of jack receptacle openings 150 configured to at least partially receive the modular jacks 104. The jack receptacle openings 150 can be configured to fit various types of modular jacks. By way of example, the jack receptacle openings 150 can be sized to receive any of the following types of modular jacks: AMP-TWIST 6S, 6AS, 7AS, SL, and AMP-TWIST 6AUTP.

Figure 5:
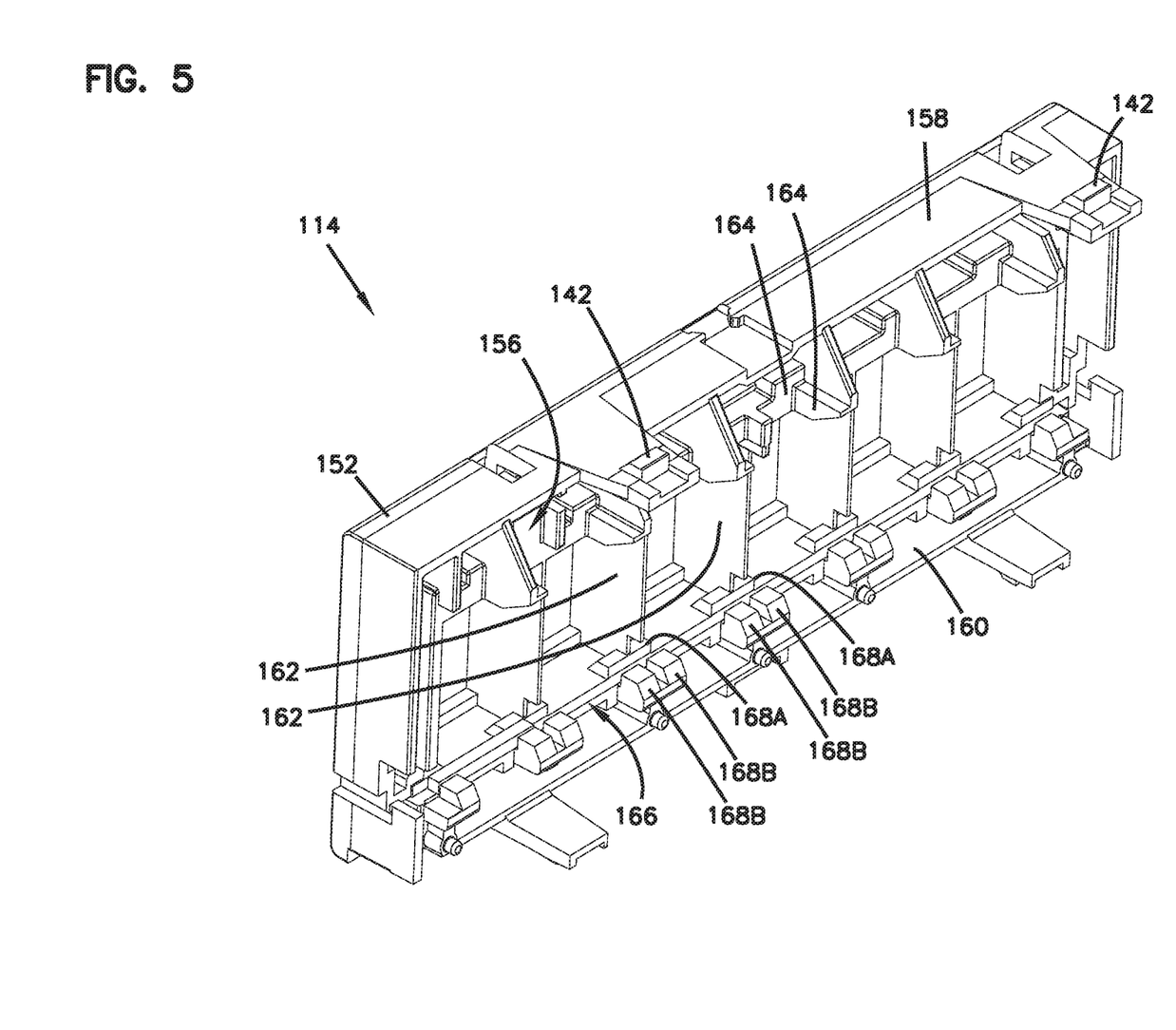
FIG. 5 is a rear perspective view of an example receptacle module.
Figure 6:
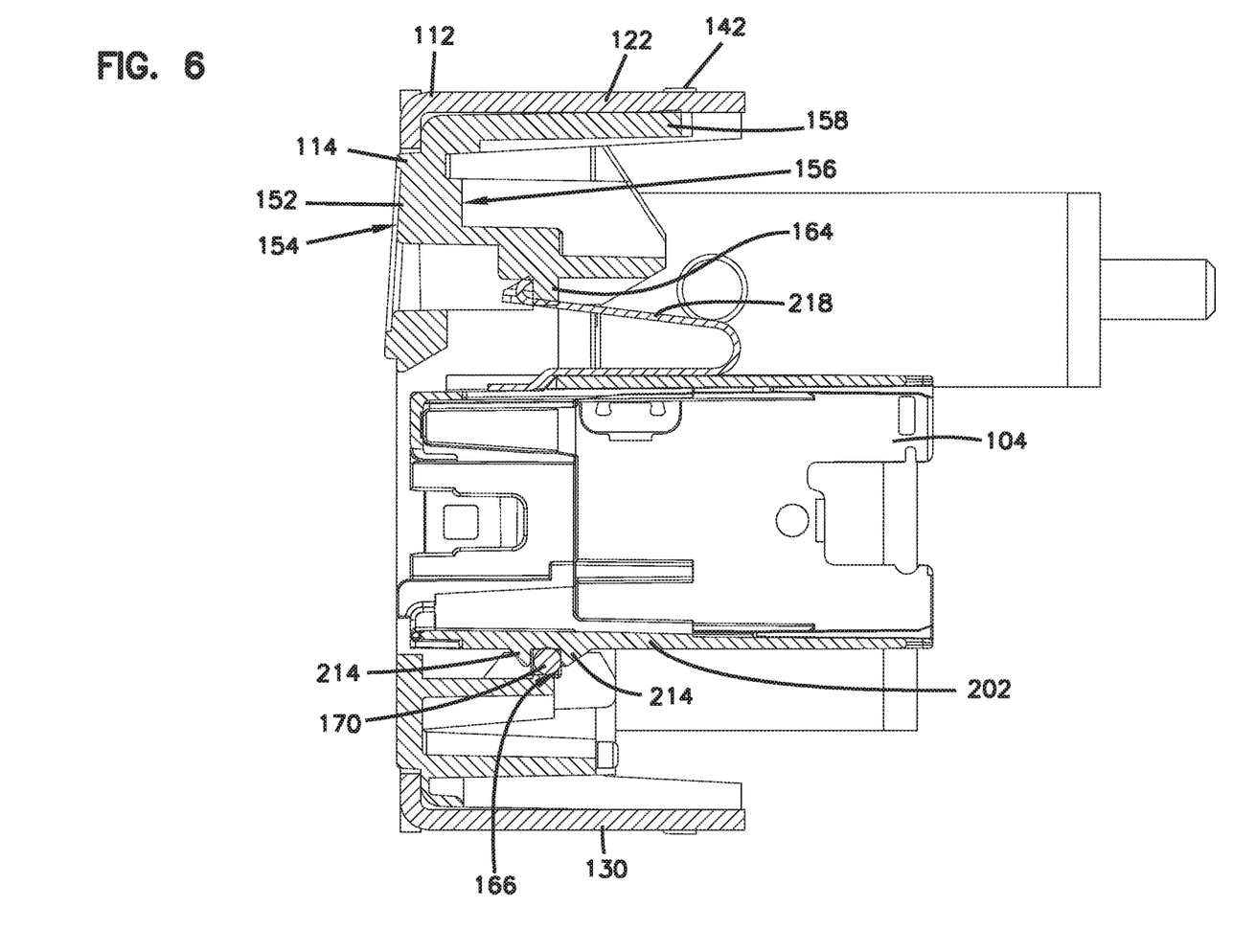
FIG. 6 is a cross sectional view of the patch panel with a modular jack, taken along line A-A of FIG. 2A.

In some examples, as best shown in FIGS. 5 and 6, the receptacle module 114 includes a front part 152 having a front face 154 and a rear face 156. The receptacle module 114 further includes a top part 158 and a bottom part 160, which extend from the rear face 156 of the front part 152. In some examples, the top part 158 and the bottom part 160 are arranged to be generally parallel with each other. The top part 158 and the bottom part 160 of the receptacle module 114 are configured to arrange adjacent the front panel portion 122 and the bottom panel portion 130 of the panel frame 112, respectively, when the receptacle module 114 is secured to the panel frame 112, as illustrated in FIG. 6. The receptacle module 114 further includes one or more partition walls 162 extending between the top part 158 and the bottom part 160 and defining the jack receptacle openings 150.

The receptacle module 114 can further include jack mounting elements 164 for securing the modular jack 104. The jack mounting elements 164 can be configured to removably engage the latching element 212 of the modular jack 104. In the illustrated example, the jack mounting elements 164 include projections extending from the top part 158 of the receptacle module 114 and configured to engage the flexible latch 218 of the modular jack 104. An example of the jack mounting elements is described in U.S. Patent Application Ser. No. 62/584,524, filed on Nov. 10, 2017, titled TELECOMMUNICATIONS PANEL WITH PATCHING DEVICE INSTALLATION FEATURES, the disclosure of which is incorporated herein by reference in its entirety.

The receptacle modules 114 can be made of various materials. In some examples, the receptacle modules 114 are made of dielectric materials, such as a plastic material.

In the illustrated example, the panel frame 112 has four receptacle module openings 140 for receiving four receptacle modules 114 in a single row, and each receptacle modules 114 is configured to mount six modular jacks 104 in a single row. In other examples, the panel frame 112 is configured to secure a greater or lesser number of receptacle modules 114 in one or more rows, and each receptacle module 114 is configured to secure a greater or lesser number of modular jacks 104 in one or more rows.

Although it is primarily described that the receptacle modules 114 are made separately from the panel frame 112 and mounted to the panel frame 112, it is understood that the receptacle modules 114 are integrally formed with the panel frame 112.

The patch panel 102 further includes a ground bus bar configured to provide grounding for the modular jacks 104 secured to the patch panel 102. As best illustrated in FIGS.

4A, 4B, 5, and 6, the ground bus bar of the patch panel 102 is configured as a ground wire 170, which is an electrically conductive wire.

The ground wire 170 is secured to the panel frame 112 and extends longitudinally along the panel frame 112. For example, the ground wire 170 extends along the length of the panel frame 112, and arranged adjacent the jack receptacle openings 150.

In some embodiments, the ground wire 170 is a separate element from the patch panel 102 and is mounted to the patch panel 102. For example, the ground wire 170 is not an integral part of the patch panel 102 which is configured to form a spring member that provides ground or bonding features.

In some examples, the ground wire 170 is arranged such that the modular jacks 104 directly contact with the ground wire 170 when the modular jacks 104 are secured to the patch panel 102 (e.g., when the modular jacks 104 are received at least partially through the front panel portion of the panel frame 112). In the illustrated example, when the modular jacks 104 are received at least partially through the jack receptacle openings 150 of the receptacle modules 114, the ground wire 170 is configured and arranged such that the modular jacks 104 press against the ground wire 170. There is no other element or component arranged between the ground wire 170 and the modular jacks 104 for grounding the modular jacks 104.

In some examples, the ground wire 170 can be routed adjacent the bottom panel portion 130 of the panel frame 112. In the illustrated example, the ground wire 170 is routed along the bottom part 160 of the receptacle module 114 adjacent the row of jack receptacle openings 150. When the modular jacks 104 are received at least partially in the jack receptacle openings 150, a metal part (e.g., the metallic main body 202) of the modular jacks 104 can seat on, and thus contact with, the ground wire 170, as illustrated in FIG. 6.

In some examples, the patch panel 102 is provided with a single ground wire 170 that extends across all of the plurality of receptacle modules 114 (and thus runs across all the modular jacks 104 secured to the receptacle modules 114). In other examples, a plurality of ground wires 170 are used for the patch panel 102. For example, each of the ground wires 170 is routed to ground the modular jacks 104 mounted to one or more of the plurality of receptacle modules 114. In such configurations, in some embodiments, all the ground wires 170 can be electrically connected to each other and one of the ground wires 170 is electrically connected to a panel grounding element 180. In other embodiments, at least some of the plurality of ground wires 170 are individually, electrically connected to one or more panel grounding elements 180 in the patch panel 102.

In some embodiments, the patch panel 102 can be configured as an angled patch panel which defines generally a shallow V-shape (rather than being flat or planar) such that the vertex of the "V" protrudes in front of the rack to which it is mounted. In this configuration, the ground bus bar of the patch panel 102 includes two ground wires 170, each of which spans half of the entire length of the patch panel (or spans one of the two sections of the patch panel defined by the V shaped protrusion) and can be placed on opposite ends (e.g., the opposite side panel portions) of the patch panel, thereby avoiding a single, long ground wire with the middle of the ground wire bent to accommodate the V-shape of the patch panel. Examples of such an angled patch panel are described in U.S. Pat. No. 7,628,644, titled Angled Patch Panel with Removable Forwarded-Extending Display, issued Dec. 8, 2009; U.S. Pat. No. 6,866,541, titled Angled patch panel with cable support bar for network cable racks, issued Mar. 15, 2005; and U.S. Pat. No. 7,220,145, titled Patch Panel System, issued May 22, 2007, the disclosures of which are hereby incorporated by reference in their entireties.

In other embodiments, the ground wire 170 can extend only partially along the full length of the patch panel. For example, the ground wire 170 can extend along a first portion of the panel frame and does not extend along a second portion of the panel frame. In some examples, unshielded products (e.g., fiber modules or UTP jacks) (other than shielded modular jacks such as STP jacks) which do not require grounding or bonding can be mounted to the second portion of the panel frame. By way of example, where there are mixed media applications to be supported with patch panels, at least one of such patch panels may utilize a ground wire which does not cover the full length of the patch panel, so that unshielded products can be installed into some of the panel openings (e.g., receptacle openings 150) where the ground wire is not routed while shielded modular jacks are mounted to the other panel openings (e.g., receptacle openings 150) of the patch panel for grounding or bonding.

The ground wire 170 can be of various configurations and dimensions. In this example, the ground wire 170 is configured to have a rounded cross section. In one example, the ground wire 170 has a circular cross section. In another example, the ground wire 170 has an oval cross section. In yet other examples, other cross sections, such as square, rectangular, or other polygonal cross sections, are also possible for the ground wire 170.

The ground wire 170 can be made of various conductive materials. In some examples, the ground wire 170 is made as a tin plated conductive wire. For example, the ground wire 170 is made of steel-based copper with tin plated, or aluminum-based copper with tin plated.

Figure 4A:
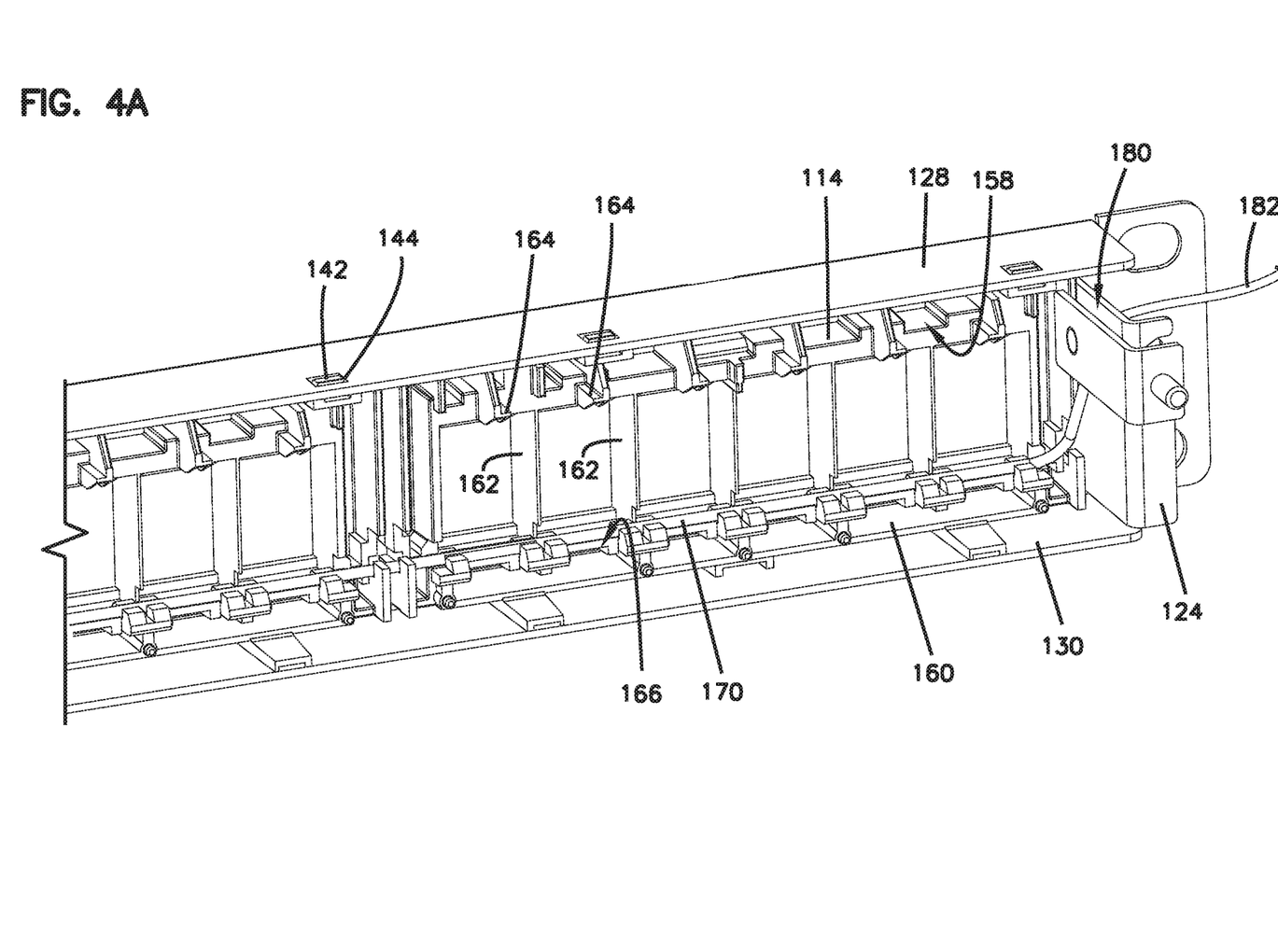
FIG. 4A is a rear perspective view of a patch panel without modular jacks mounted.

As best illustrated in FIGS. 4A, 5 and 6, the receptacle module 114 includes a channel 166 that at least partially receives the ground wire 170. The channel 166 can extend between the opposite side panel portions 124 of the panel frame 112. In the illustrated example, the channel 166 is formed on the bottom part 160 of the receptacle module 114 and adjacent the row of jack receptacle openings 150. The channel 166 can extend in a direction parallel with the row of jack receptacle openings 150.

As shown in FIG. 5, the channel 166 can be defined between pairs of tabs 168A and 168B. In the illustrated example, each pair of tabs 168A and 168B is arranged to be spaced apart from adjacent pairs of tabs along the direction parallel with the row of jack receptacle openings 150 so that the channel 166 is generally defined along the same direction (e.g., the channel 166 can have open portions between adjacent pairs of tabs as illustrated in FIG. 5). The pairs of tabs can be provided at the bottom part 160 of the receptacle module 114 adjacent the partition walls 162. The pairs of tabs are configured to partially receive the ground wire 170 and secure the ground wire 170 therein.

Other configurations and arrangements of the tabs 168A and 168B are also possible. By way of example, the tabs 168A and 168B are continuously formed along the direction parallel with the row of jack receptacle openings so that the channel 166 is completely formed therebetween along the entire length of the receptacle module 114.

In some examples, as illustrated in FIG. 6, the channel 166 is positioned to align with the slot 216 (FIG. 7) between the projections 214 of the latching element 212 of the modular jack 104 when the modular jack 104 is secured to the patch panel 102. In this configuration, the ground wire 170 disposed in the channel 166 can be used as a jack retention feature. For example, the ground wire 170 can function as a jack retention flange that is at least partially inserted into the slot 216 formed in the modular jack 104 when the modular jack 104 is mounted to the patch panel 102. As such, the ground wire 170 is arranged in the channel 166 so as to directly engage the latching element (e.g., the projections 214) of the modular jack 104 being mounted to the receptacle module 114. An example of such a jack retention flange is described in U.S. Patent Application Ser. No. 62/584,524, filed on Nov. 10, 2017, titled TELECOMMUNICATIONS PANEL WITH PATCHING DEVICE INSTALLATION FEATURES, the disclosure of which is incorporated herein by reference in its entirety.

Figure 1A:
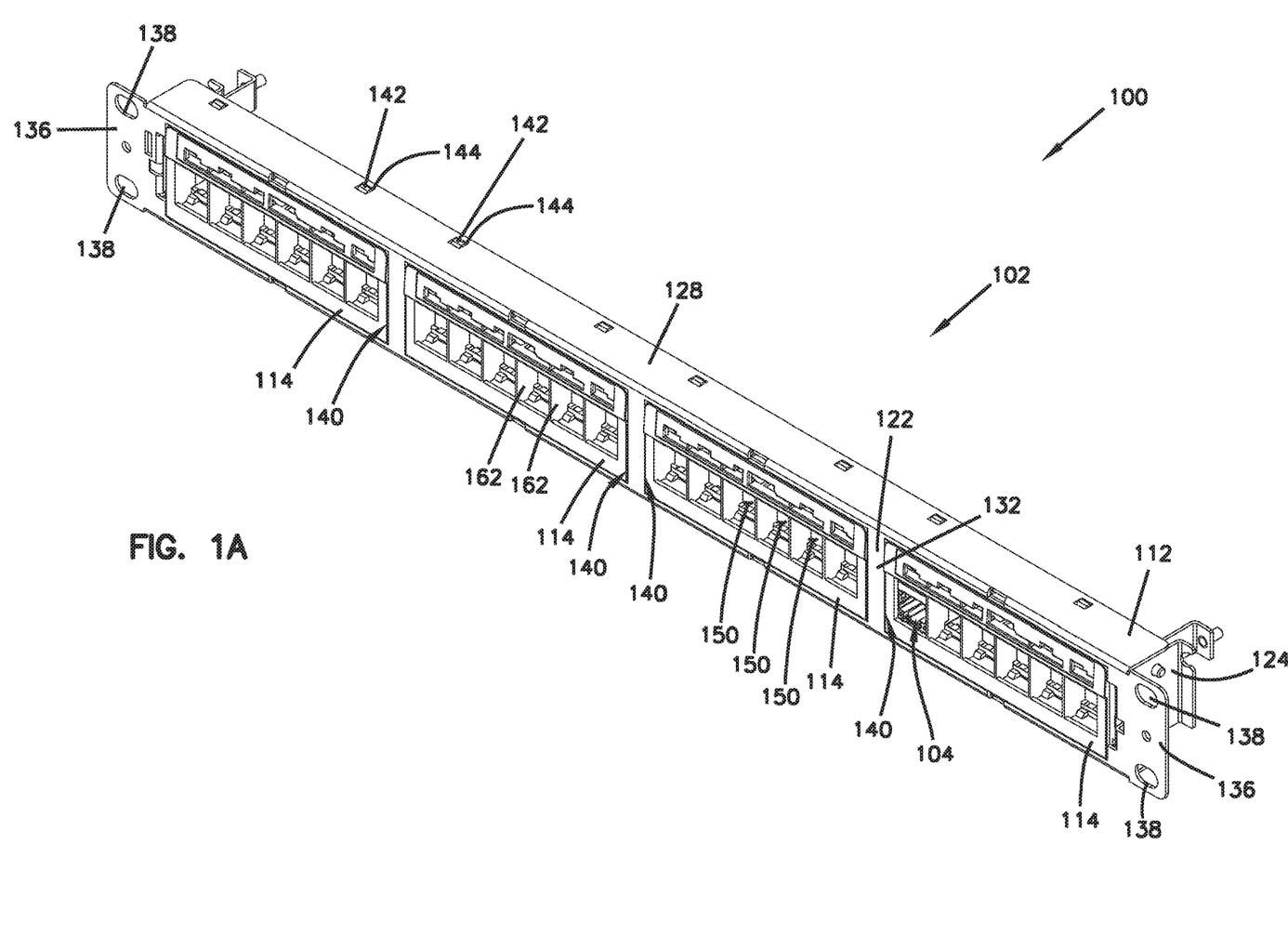
FIG. 1A is a front perspective view of an example patch panel system.
Figure 1B:
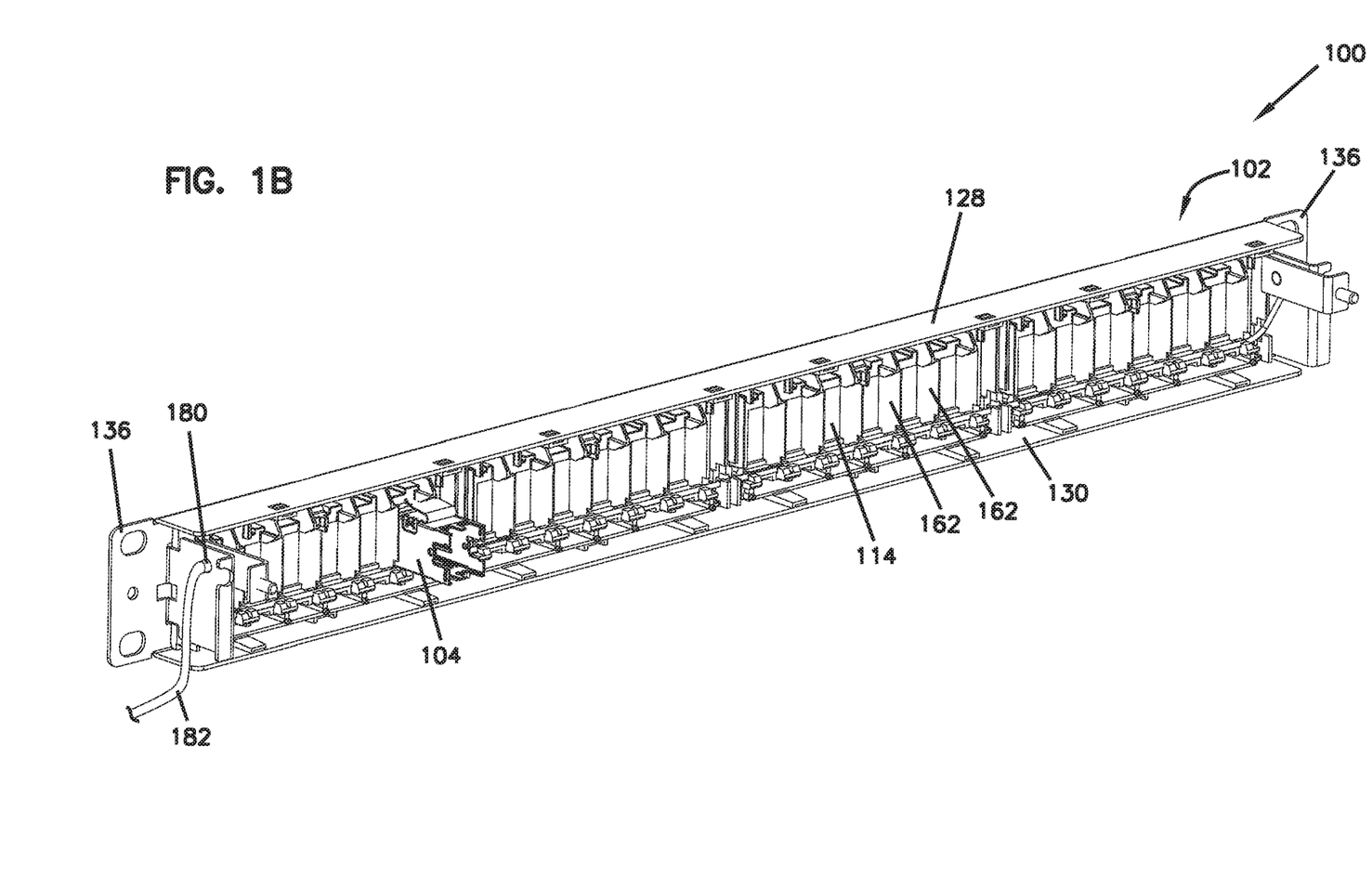
FIG. 1B is a rear perspective view of the patch panel system of FIG. 1A.
Figure 2A:
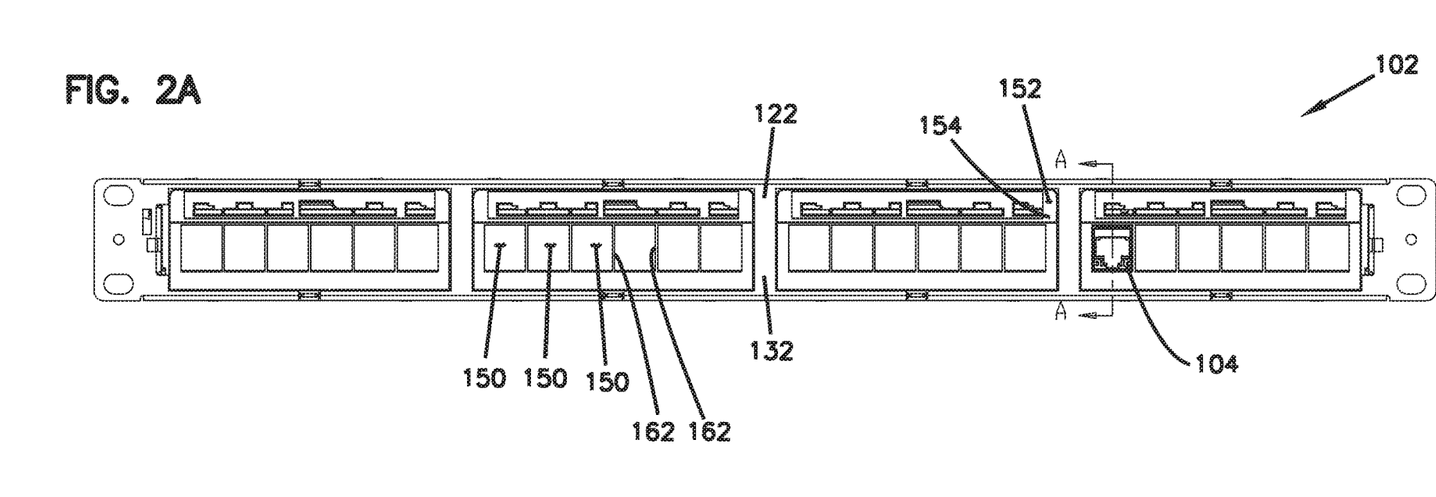
FIG. 2A is a front view of the patch panel system of FIG. 1A.
Figure 2B:
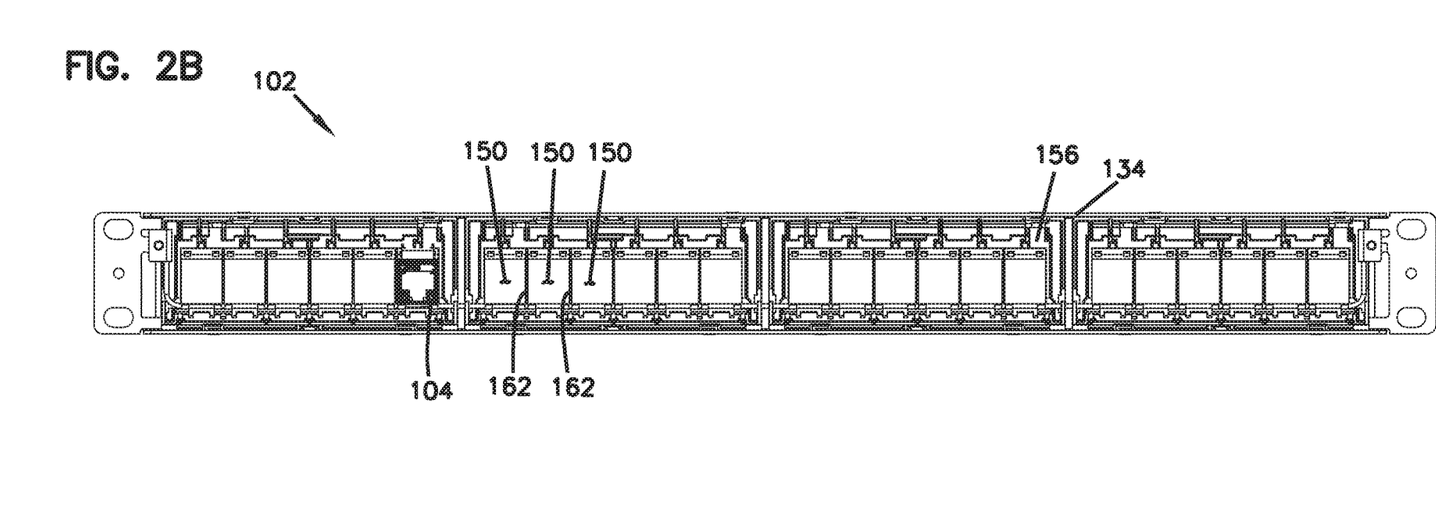
FIG. 2B is a rear view of the patch panel system of FIG. 1A.
Figure 3A:
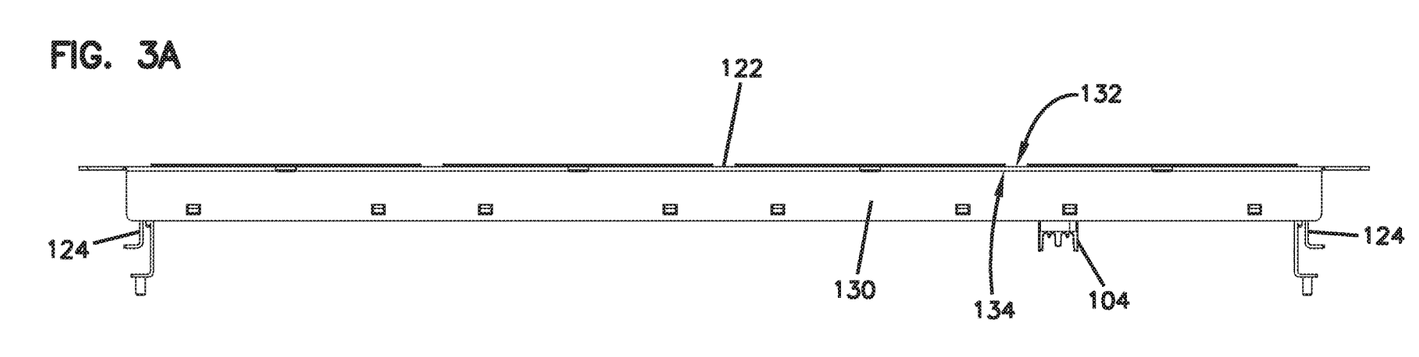
FIG. 3A is a bottom view of the patch panel system of FIG. 1A.
Figure 3B:
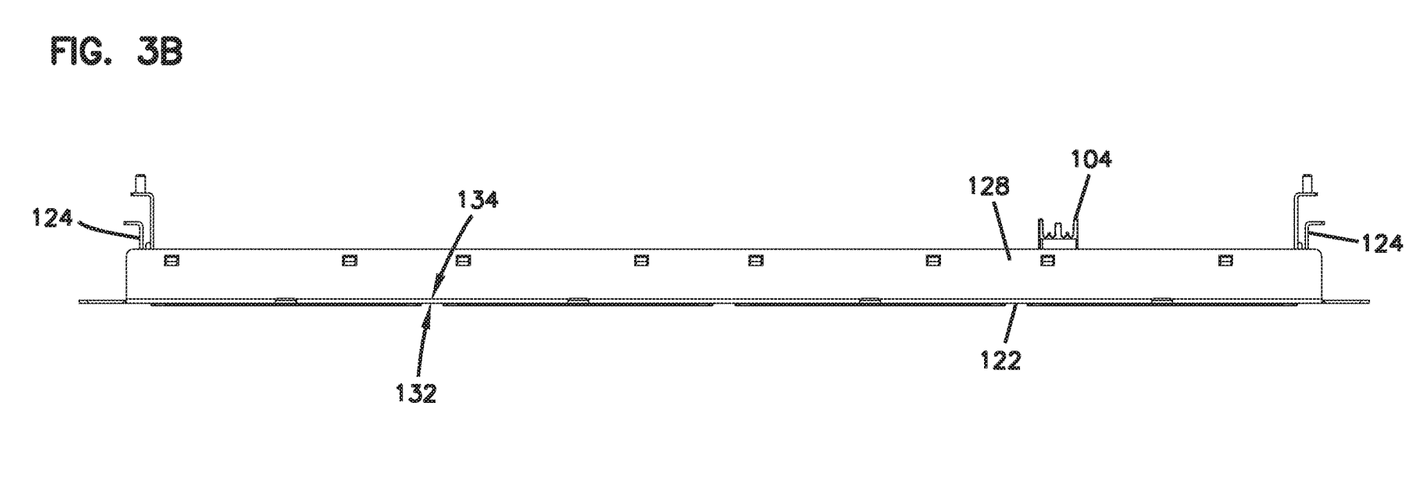
FIG. 3B is a top view of the patch panel system of FIG. 1A.
Figure 4B:
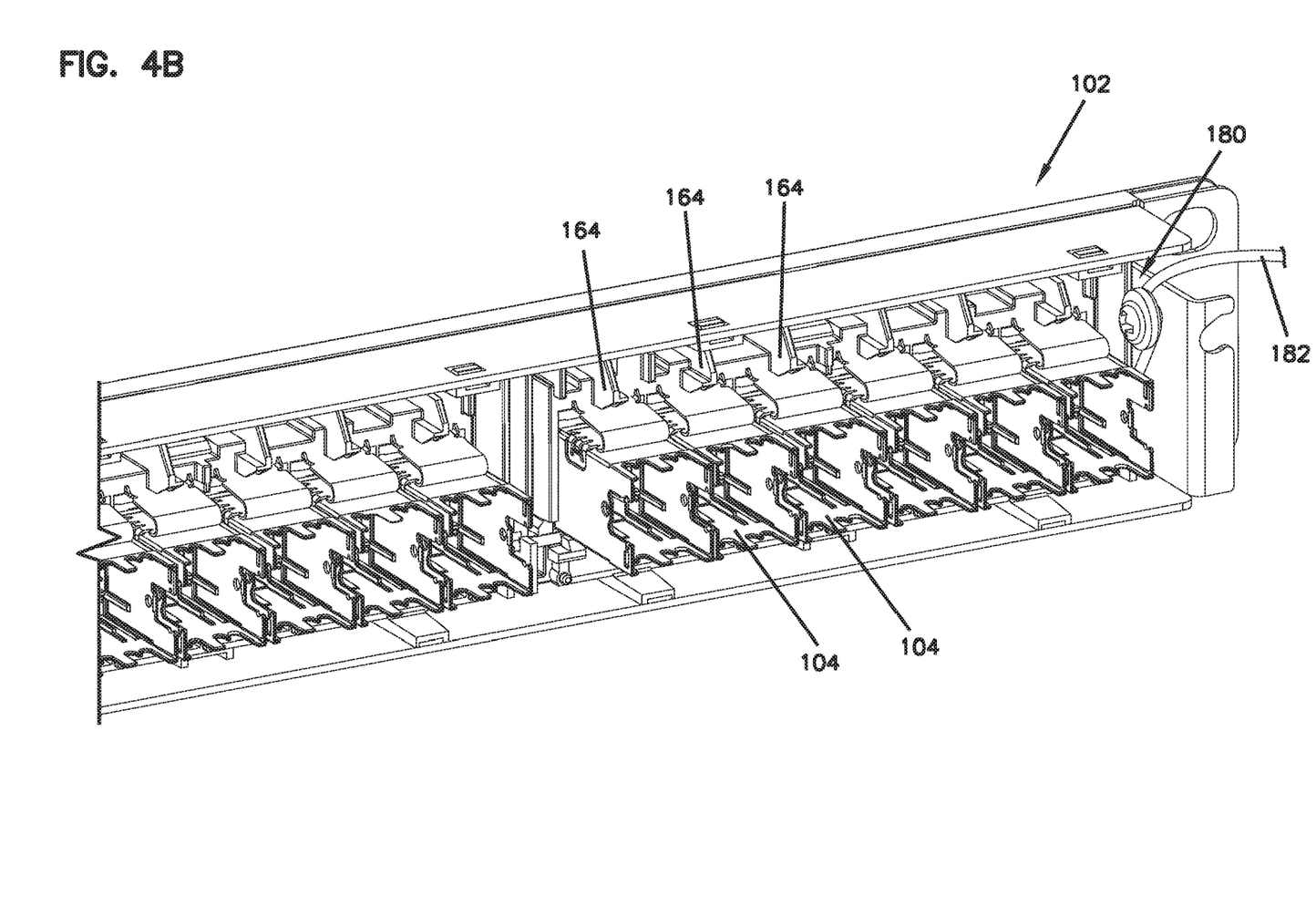
FIG. 4B is a rear perspective view of the patch panel of FIG. 4A with modular jacks mounted.

As illustrated in FIGS. 1B, 4A and 4B, the patch panel 102 includes a panel grounding element 180 that is used to ground the patch panel 102. In some examples, the panel grounding element 180 is provided at either or both of the side panel portions 124 of the panel frame 112. The panel grounding element 180 can provide a location to which a conductive element 182 is connected for providing electrical connection for grounding between the patch panel 102 and the equipment rack to which the patch panel 102 is mounted. In some examples, the conductive element 182 can be a conductive wire that is routed between the panel grounding element 180 of the patch panel 102 and the equipment rack or any other structure suitable for grounding purposes.

In the illustrated example of FIG. 4B, the panel grounding element 180 includes a fastener 184, such as a screw, which is used to couple the conductive element 182. The panel grounding element 180 can be made of metallic material. An end of the ground wire 170 of the patch panel 102 can be fixed to the side panel portion 124 by the fastener 184. Accordingly, the ground wire 170 can be electrically connected to the conductive element 182 through the panel grounding element 180. In other examples, such as illustrated in FIGS. 1B and 4A, the panel grounding element 180 can include other types of elements (e.g., a connector) suitable to couple the conductive element 182 to the side panel portion 124, couple the ground wire 170 to the side panel portion 124, and/or the ground wire 170 to the conductive element 182.

Although it is primarily described that the ground wire 170 is arranged at or adjacent the bottom panel portion 130 of the panel frame 112 or the bottom part 160 of the receptacle module 114, it is understood that, in other embodiments, the ground wire 170 can be routed at or adjacent the top panel portion 128 of the panel frame 112 or the top part 158 of the receptacle module 114 in the same or similar configurations as described herein.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A telecommunications panel comprising:
   a panel frame having a front panel portion and opposite side panel portions, the front panel portion extending between the opposite side panel portions and configured to receive a plurality of modular jacks therethrough, the panel frame including a plurality of tabs defining a channel; and
   a ground wire secured to the panel frame by the plurality of tabs and extending longitudinally along the panel frame within the channel, the ground wire arranged such that the plurality of modular jacks presses against the ground wire when the plurality of modular jacks are received through the front panel portion of the panel frame.

2. The telecommunications panel according to claim 1, wherein the ground wire is configured to engage with latching elements of the modular jacks for securing the modular jacks to the panel frame.

3. The telecommunications panel according to claim 1, wherein the ground wire is a tin plated conductive wire.

4. The telecommunications panel according to claim 1, wherein at least one of the opposite side panel portions includes a panel grounding element configured to ground the telecommunications panel to an equipment rack, and wherein the ground wire is electrically connected to the panel grounding element.

5. The telecommunications panel according to claim 4, wherein the panel grounding element includes a fastener that secures the ground wire to the at least one of the opposite side panel portions.

6. The telecommunications panel according to claim 1, wherein the panel frame includes a channel extending between the opposite side panel portions and configured to receive the ground wire.

7. The telecommunications panel according to claim 1, wherein the panel frame further includes opposite lateral flanges adjacent the opposite side panel portions, the lateral flanges including mounting elements configured to mount the telecommunications panel to an equipment rack.

8. The telecommunications panel according to claim 1, further comprising:
   a plurality of receptacle modules secured to the panel frame and defining a plurality of jack receptacle openings for receiving the plurality of modular jacks, respectively.

9. The telecommunications panel according to claim 8, further comprising one or more of the plurality of modular jacks, wherein the plurality of modular jacks is secured to the panel frame in at least one row extending between the opposite side panel portions of the panel frame.

10. The telecommunications panel according to claim 9, wherein the ground wire is routed in a direction parallel with the at least one row.

11. The telecommunications panel according to claim 9, wherein the plurality of modular jacks includes shielded twisted pair (STP) jacks.

12. The telecommunications panel according to claim 1, further comprising a plurality of ground wires secured to the panel frame and extending longitudinally along the panel frame.

13. The telecommunications panel according to claim 1, wherein the panel frame is configured to receive unshielded products replacing at least one of the modular jacks.

14. The telecommunications panel according to claim 13, wherein the ground wire extends along a first portion of the panel frame and does not extend along a second portion of the panel frame, and wherein the unshielded products are mounted to the second portion of the panel frame.

15. A telecommunications panel comprising:
   a panel frame including a front panel portion having a front face and an opposite rear face; a top panel portion extending from the rear face of the front panel portion; a bottom panel portion extending from the rear face of the front panel portion and arranged to be parallel with the top panel portion; and opposite side panel portions extending from the rear face of the front panel portion, the front panel portion longitudinally extending between the opposite side panel portions and having a plurality of receptacle module openings, the panel frame including a plurality of tabs defining a channel;

a plurality of receptacle modules at least partially received in the plurality of receptacle module openings and secured to the panel frame between the top panel portion and the bottom panel portion, each of the plurality of receptacle modules including a plurality of jack receptacle openings configured to receive a plurality of modular jacks therethrough; and a ground wire routed longitudinally along the panel frame within the channel and being secured within the channel by the plurality of tabs, the ground wire having a rounded cross section and arranged such that the plurality of modular jacks presses against the ground wire when the plurality of modular jacks are received through the plurality of jack receptacle openings of the plurality of receptacle modules.

16. The telecommunications panel according to claim 15, wherein each of the plurality of receptacle modules includes:

a front part having a front face and an opposite rear face;

a top part extending from the rear face and configured to be arranged adjacent the top panel portion of the panel frame when the receptacle module is secured to the panel frame;

a bottom part extending from the rear face and configured to be arranged adjacent the bottom panel portion of the panel frame when the receptacle module is secured to the panel frame; and at least one partition wall extending between the top part and the bottom part and defining the plurality of jack receptacle openings;

wherein the bottom part includes a channel configured to receive the ground wire.

17. The telecommunications panel according to claim 15, wherein the plurality of jack receptacle openings is arranged in at least one row, and wherein the channel extends in a direction parallel with the at least one row.

18. The telecommunications panel according to claim 15, further comprising one or more of the plurality of modular jacks, wherein each of the plurality of modular jacks has a main body made of metallic material, the main body arranged to contact with the ground wire when the modular jack is secured to the panel frame.

19. The telecommunications panel according to claim 15, wherein the panel frame and the plurality of receptacle modules are integrally formed.

20. A method for engaging a modular jack with a telecommunications panel, the method comprising:

arranging a ground wire to a panel frame of the telecommunications panel to extend longitudinally along the panel frame within a channel defined by a plurality of tabs provided on the panel frame, wherein the plurality of tabs secure the ground wire within the channel; and securing a modular jack to the panel frame by directly pressing against the ground wire.

* * * * *